US 6,597,694 B1

(12) United States Patent
Fondekar et al.

(10) Patent No.: US 6,597,694 B1
(45) Date of Patent: Jul. 22, 2003

(54) SYSTEM AND METHOD FOR GENERATING BULK CALLS AND EMULATING APPLICATIONS

(75) Inventors: Biren V. Fondekar, Fremont, CA (US); Kui Zhang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/105,900

(22) Filed: Jun. 26, 1998

(51) Int. Cl.[7] .............................................. H04L 12/28
(52) U.S. Cl. ...................................................... 370/389
(58) Field of Search ................................ 370/389, 470, 370/522, 413, 466, 501, 445–449, 469, 235; 379/10–10.03, 242, 201, 93.08, 93.14, 13–15, 29.01; 714/43, 32, 12

(56) References Cited

U.S. PATENT DOCUMENTS

| | | | | |
|---|---|---|---|---|
| 5,440,719 A | * | 8/1995 | Hanes et al. ................... 703/21 |
| 5,748,901 A | * | 5/1998 | Afek et al. .................... 370/229 |
| 5,761,272 A | * | 6/1998 | Williams et al. ........... 379/10.03 |
| 5,828,665 A | | 10/1998 | Husak ......................... 370/387 |
| 5,949,783 A | | 9/1999 | Husak et al. ................ 370/396 |
| 5,987,633 A | * | 11/1999 | Newman et al. ............... 714/12 |
| 6,052,597 A | * | 4/2000 | Ekstrom ...................... 455/456 |
| 6,269,076 B1 | | 7/2001 | Shamir et al. .............. 370/217 |
| 6,324,163 B1 | | 11/2001 | Alexander, Jr. et al. .... 370/229 |
| 6,411,625 B1 | | 6/2002 | Furuhashi et al. ...... 370/395.53 |

* cited by examiner

Primary Examiner—Kwang Bin Yao
Assistant Examiner—Prenell Jones
(74) Attorney, Agent, or Firm—Baker Botts L.L.P.

(57) ABSTRACT

According to an embodiment of the present invention, a router is converted into a bulk call generator which generates packets with Internet protocol (IP) addresses for the purpose of simulating network traffic. These packets are initially either captured or created. When the packets are captured, they are captured from actual network traffic and rerouted to various selected IP addresses which are used for simulation purposes. Alternatively, when the packets are created, they are created within the converted router and various selected IP addresses, reserved for simulation purposes, are assigned to the packets. The various selected IP addresses may be in a range which is user configurable. The IP addresses may be selected from this range by any method, such as incrementation, decrementation, or random selection. Connections are set up according to a routing table based on the IP addresses of the various data packets.

17 Claims, 4 Drawing Sheets

SYSTEM AND METHOD FOR GENERATING BULK CALLS AND EMULATING APPLICATIONS

FIELD OF THE INVENTION

The present invention relates to a network simulation for testing network performance. In particular, the present invention relates to bulk call generation and application emulation for purposes of testing and simulation for evaluating the performance of a network.

BACKGROUND OF THE INVENTION

A computer network includes a set of communication channels interconnecting a set of computing devices or nodes that can communicate with each other. These nodes may be computers, terminals, workstations, or communication units of various kinds distributed over different locations. They communicate over communications channels that can be leased from common carriers (e.g. telephone companies) or are provided by the owners of the network. These channels may use a variety of transmission media, including optical fibers, coaxial cable, twisted copper pairs, satellite links, or digital microwave radio. The nodes may be distributed over a wide area (distances of hundreds or thousands of miles) or over a local area (distances of a hundred feet to several miles), in which case the networks are called wide area (WAN) or local area (LAN) networks, respectively. Combinations of LANs and WANs are also possible in the case of widely separated LANs in branch offices located via a WAN to the LAN in corporate headquarters.

Recently, modem computer networks have greatly increased in number and geographical area, in the number and variety of devices interconnected, and in the scope of applications supported. A modem network may consist of thousands of computing devices made by various manufacturers connected by a variety of transmission media spanning international and intercontinental boundaries.

FIG. 1 is a block diagram illustrating interactions between users and a network. FIG. 1 shows users 100A–100C who are attempting to make calls to various Internet protocol addresses in the network 106. Users 100A–100C may be any entity attempting to access network 106, such as an individual user, a server, or a corporation. Users 100A–100C typically call into a central office, such as Pacific Bell, which in turn calls an Internet service provider 104, such as Netcom. The call typically terminates with an Internet service provider 104. A router then typically uses a network protocol connection, such as a transmission control protocol/Internet protocol (TCP/IP), to distribute the calls made by the users 100A–100C to the appropriate Internet protocol (IP) addresses in the network 106.

For testing and simulation purposes, it is often useful to simulate users 100A–100C and the central office 102 to determine the quality and performance of the network 106. For instance, it may be useful for the Internet service provider 104 to determine how many number of calls it can handle within a given amount of time. With that information, the Internet service provider 104 could determine whether its infrastructure is adequate to provide services for its customers. Another instance in which testing and simulation may be required is if a customer does not wish to build its own network, but contracts for a service agreement to utilize someone else's private network. Typically, these service level agreements agree to provide availability for a certain percent of time. In order to monitor the contracts, simulations can occur which mimics the customers' access to provide proof that the network can simultaneously handle a given number of calls and that the agreed percentage of availability is actually being provided.

FIG. 2 shows a block diagram of a system for testing a network. FIG. 2 shows a bulk call generator 200, such as the bulk call generator manufactured by Abacus, making calls to the network 106. The bulk call generator 200 simulates the users 100A–100C and the central office 102 of FIG. 1 by generating a large number of calls into the network 106. The bulk call generator 200 typically generates a large number of calls into the network 106 to be rerouted back to the bulk call generator 200. In other words, the bulk call generator 200 makes a large number of calls to itself through the network 106. In this manner, the bulk call generator 200 simulates the users 100A–100C and the central office 102 of FIG. 1 to test the performance of the network 106. These conventional bulk call generators 200 are typically a device with dedicated hardware specifically designed to create bulk calls. The conventional bulk call generators 200 typically range in price from $100,000 to $500,000.

Although simulation and testing can be accomplished with conventional bulk call generators, they tend to be extremely expensive. Additionally, conventional bulk call generators typically do not include a variety of IP addresses as part of the test scenario.

It would be desirable to have a bulk call generator which does not require dedicated hardware, which can be manufactured at a reasonable price, and which includes a variety of IP addresses as part of the test scenario. The present invention addresses such a need.

SUMMARY OF THE INVENTION

The present invention is a system and method for generating bulk calls and emulating applications. According to an embodiment of the present invention, a router is converted into a bulk call generator which generates packets with Internet protocol (IP) addresses for the purpose of simulating network traffic. These packets may be initially either captured or created. When the packets are captured, they may be captured from actual network traffic and rerouted to various selected IP addresses which are used for simulation purposes. Alternatively, when the packets are created, they may be created within the converted router and various selected IP addresses, reserved for simulation purposes, are assigned to the packets. The various selected IP addresses may be in a range which is user configurable. The IP addresses may be selected from this range by any method, such as incrementation, decrementation, or random selection. Connections may be set up according to a routing table based on the IP addresses of the various data packets.

According to an embodiment of the present invention, a set of parameters is assigned to each data packet. Examples of parameters include an interface assignment, packet issuance rate, duration for the rate, number of times to repeat this set of parameters, and a modification scheme for modifying the IP address. A send engine in the converted router may receive the set of parameters and send the data packet according to the instructions in the set of parameters associated with the data packet.

A method according to an embodiment of the present invention for generating a plurality of calls to a network is presented. The method comprising a step of providing a data packet with an address, wherein the address identifies a location within a network, the device being configurable to perform as a router. The method also comprising providing a record with at least one traffic parameter; and sending the data packet to the network for a simulation purpose, the data packet being sent according to the at least one traffic parameter.

A system according to an embodiment of the present invention for generating a plurality of calls to a network is also presented. The system comprising a packet generator subsystem included in a device, wherein the device is configurable to perform as a router, and wherein the packet generator subsystem provides a data packet with an address, wherein the address identifies a location within a network. The system also comprising a dial shelf coupled to the packet generator subsystem, wherein the packet generator subsystem is configured to request the dial shelf to prepare to send a predetermined number of calls for a simulation purpose.

Another system according to an embodiment of the present invention for generating a plurality of calls to a network is presented. The system comprising a means for providing a data packet with an address, wherein the address identifies a location within a network, the device being configurable to perform as a router. The system also comprising a means for providing a record with at least one traffic parameter; and a means for sending the data packet to the network for a simulation purpose, the data packet being sent according to the at least one traffic parameter.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
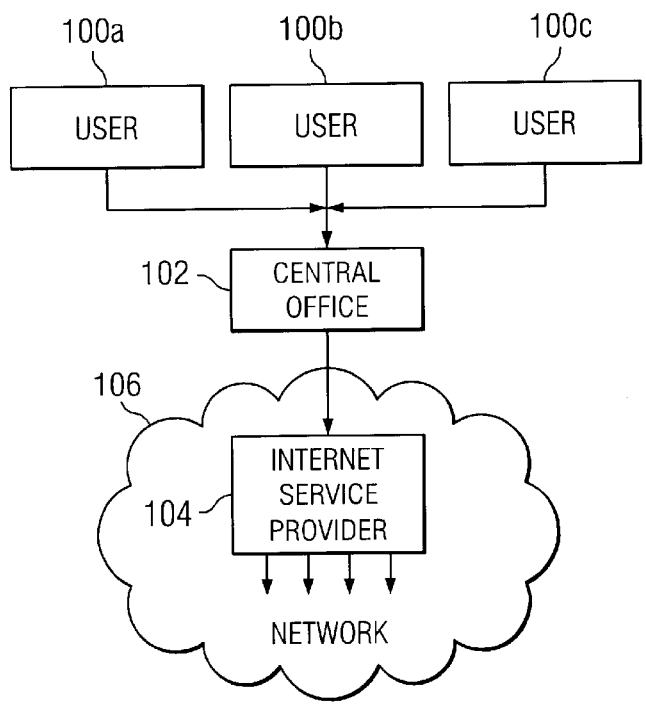
FIG. 1 is a block diagram of users accessing a network.
Figure 2:
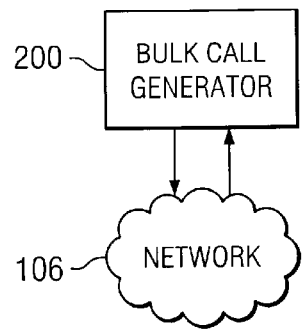
FIG. 2 is a block diagram of a network simulation.
Figure 3:
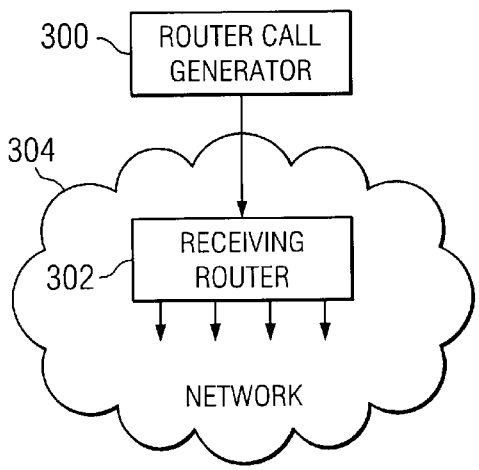
FIG. 3 is a block diagram of a network simulation according to an embodiment of the present invention.

FIG. 3 is a block diagram of a system according to an embodiment of the present invention for testing the performance of a network. FIG. 3 includes a router call generator 300 which simulates calls and emulates applications to a receiving router 302. The router call generator 300 may also send calls to an Internet service provider such as that shown in FIG. 1. In this example, a receiving router receives the router call generator's calls and disseminates them to various Internet protocol (IP) addresses in the network 304. The router call generator 300 may be a conventional router that is suitable for implementation of the present invention. Examples of such a router suitable for implementation of the present invention include Cisco 5800 series router, and Cisco 5300 series router, both manufactured by Cisco Systems, Incorporated.

One advantage of utilizing a conventional router to implement the present invention is that the cost of converting such a router is substantially less than buying a device with dedicated hardware which can range from $100,000 to $500,000. Since a suitable router can simply be loaded with a new program to implement the present invention, the cost of testing a network according to embodiments of the present invention should be substantially less than the cost of testing the network with a conventional bulk call generator. Another advantage of the system and method according the present invention is that an embodiment of the present invention calls various IP addresses of the network 304. The present invention facilitates simulation with data with different sizes and patterns which may cause problems for a receiving router. Applications may be emulated by sending data packets that resemble real traffic. Accordingly, a more realistic simulation of network performance can be evaluated.

Figure 4:
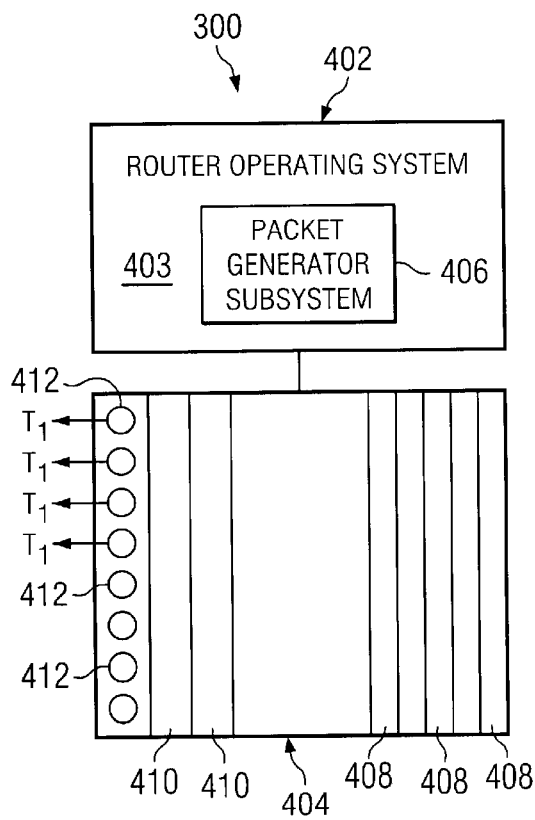
FIG. 4 is a block diagram of a system according to an embodiment of the present invention for generating bulk calls and emulating applications.

FIG. 4 is a block diagram of a system according to an embodiment of the present invention for generating bulk calls and emulating applications. FIG. 4 shows a simplified block diagram of the router call generator 300 shown in FIG. 3. The router call generator 300 is shown to include a router shelf 402 coupled with a dial shelf 404. The router shelf 402 includes a router operating system 403 which in turn includes a packet generator subsystem 406. The dial shelf 404 includes communication cards, such as T1/E1 trunk cards 410 and modem cards 408. T1 refers to T1 communication lines, and E1 refers to communication lines used in Europe which are equivalent to T1 communication lines. Alternatively, the trunk cards 410 may be configured to be utilized with other communication lines, such as T3 communication lines. The T1/E1 trunk cards 410 generates digital calls, while the modem cards 408 generate analog calls.

The dial shelf 404 is also shown to include a plurality of T1 ports 412. These ports 412 are configured to be coupled to communication lines, such as T1, E1, or T3. Accordingly, digital calls generated via the trunk cards 410 are transmitted through the communication ports 412. Digital versions of the analog calls generated by modem cards 408 are also transmitted through the communication ports 412.

Figure 5:
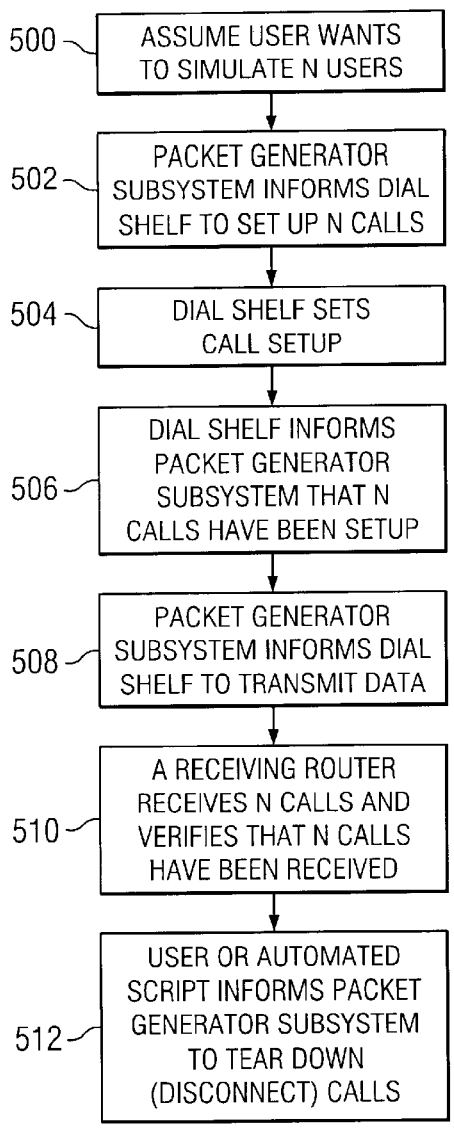
FIG. 5 is a flow diagram of a method according to an embodiment of the present invention for generating bulk calls and emulating applications.

FIG. 5 is a flow diagram of a method according to an embodiment of the present invention for generating bulk calls and emulating applications. It is first assumed that a user wishes to simulate N users calling into the network, via step 500. The packet generator subsystem (406 of FIG. 4)

informs the dial shelf 404 to set up N calls, via step 502. The dial shelf 404 sets call set up, via step 504. When the dial shelf 404 sets call set up, calls are setup with appropriate negotiations, such as use of tones. Dial shelf 404 then informs the packet generator subsystem 406 that N calls have been set up, via step 506. Note that the dial shelf 404 may inform the packet generator subsystem 406 that N-X calls have been set up wherein X is the number of calls which were requested but failed to be set up. For this example, it is assumed that all N requested calls have been set up.

The packet generator subsystem 406 then informs the dial shelf 404 to transmit data, via step 508. A receiver for the network, such as a receiving router, receives the N calls and verifies that the N calls have been received, via step 510. The user, or an automated script, then informs the packet generator subsystem 406 to tear down (disconnect) the calls, via step 512.

Figure 6:
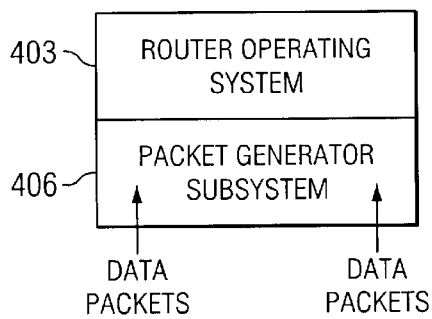
FIG. 6 is a block diagram illustrating a packet generator subsystem's interactions with data packets according to an embodiment of the present invention.

FIG. 6 illustrates interactions between the packet generator subsystem and data packets. As data packets enter the router, it passes by the packet generator subsystem 406 prior to being evaluated by the router operating system 403. The packet generator subsystem 406 can perform a filtering function such that if a given data packet meets a predetermined criteria, the packet generator subsystem 406 may capture the data packets which meet these criterias. Accordingly, the data packets which meet the predetermined filtering criteria are not received by the router operating system 403. An example of a predetermined filtering criteria include a predetermined series of IP addresses. If a data packet passes by the packet generator subsystem 406 with an IP address which fits into one of the predetermined sets of IP addresses, then the packet generator subsystem 406 will capture that data packet.

Figure 7:
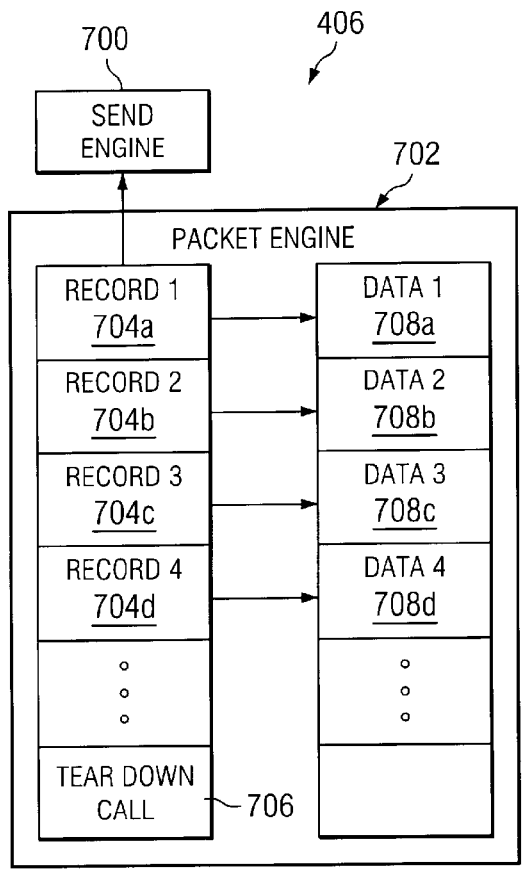
FIG. 7 is a block diagram of a packet generator subsystem according to an embodiment of the present invention.

FIG. 7 is a block diagram of the packet generator subsystem 406. The packet generator subsystem 406 includes a send engine 700, and a packet engine 702. The packet engine 702 includes a set of records 704A–704D which corresponds to one of data packets 706A–708D. The send engine 700 receives the records 704A–704D, preferably in some sequential order, and sends the data packets 706A–708D out according to instructions written in the records 704A–704D. The send engine 700 continues to send the data 706A–708D until it receives a tear down call 706. Further details of the send engine 700 will later be discussed in conjunction with FIGS. 9 and 10.

Figure 8:
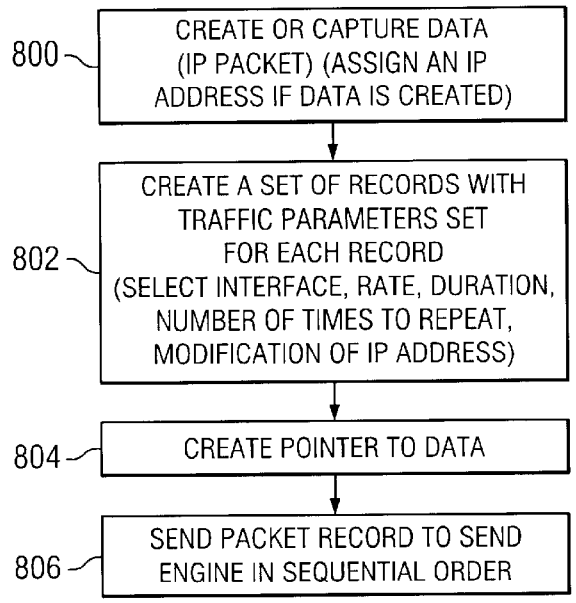
FIG. 8 is a flow diagram of a method performed by a packet engine according to an embodiment of the present invention.

FIG. 8 is a flow diagram of a method performed by the packet engine 702 of FIG. 7 for creating and sending packet data and records. Data packets are either created or captured, via step 800. If a data packet is created, then it is created through well known methods, and an IP address is assigned to the created data packet. If, however, a data packet is captured, then it may be captured according to a filtering method, such as the filtering method described in conjunction with FIG. 6.

A set of records (704A–704D) are then created with traffic parameters set for each record, via step 802. These traffic parameters include selecting an interface for the associated data to be transmitted, such as port 412 of FIG. 4. The traffic parameters may also include a traffic stream rate, such as one hundred packets per second. The duration for which the rate is to be performed may also be included in the parameters, such as one hundred packets per second for ten minutes. The traffic parameters may also include the number of times to repeat the instructions (traffic parameters) of the current record, and a scheme for modification of IP addresses. For example, the scheme for modification of the data packet IP addresses may include a predetermined set of IP addresses, for instance address 0001–address 0100, and a scheme to vary the IP addresses within the predetermined set of IP addresses. For instance, the set of IP addresses may be address 0001–address 0100, and an addresses within that predetermined set may be randomly selected, incrementally selected, or decrementally selected.

A pointer from each record to a data packet is then created, via step 804. Packet records are then sent to the send engine in a predetermined manner, such as sequential order, via step 806.

Figure 9:
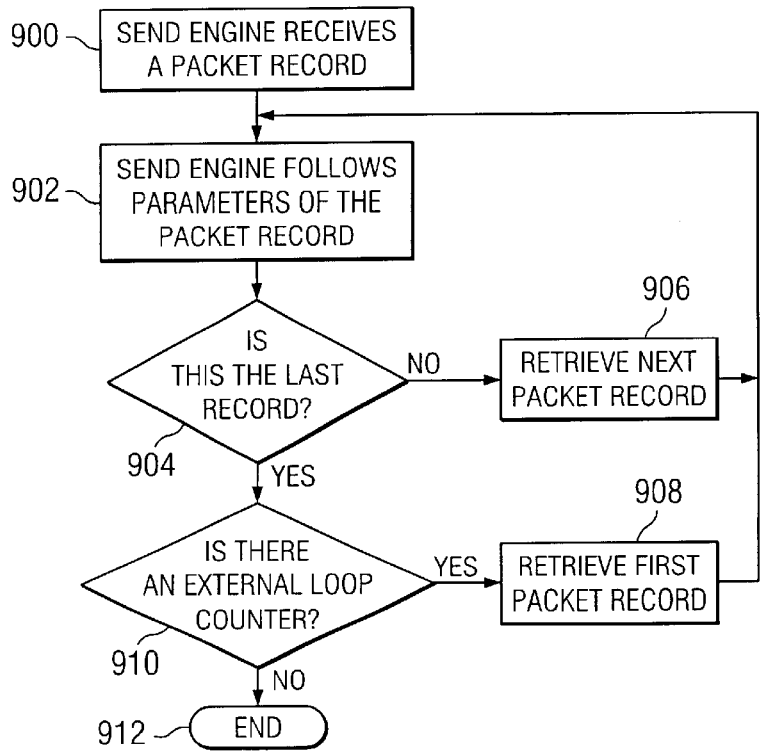
FIG. 9 is a flow diagram of a method performed by the sender engine according to an embodiment of the present invention.

FIG. 9 is a flow diagram of a method performed by the send engine 700 of FIG. 7. The send engine receives a packet record 704A, via step 900. The send engine then follows parameters of the packet record, via step 902. Details of the step of the send engine following the parameters (instructions) of the packet record will later be discussed in conjunction with FIG. 10.

It is then determined whether the currently evaluated record is the last record, via step 904. If it is not the last record, then the next packet record is retrieved, via step 906, and the send engine follows the parameters of the new packet record, via step 902.

If the currently evaluated record is the last record, via step 904, then it is determined whether there is an external loop counter, via step 910. An external loop counter is a variable which indicates whether to repeat the evaluation of the entire set of packet records. If there is no external loop counter, via step 910, then the send engine is finished, via step 912. If, however, there is an external loop counter, via step 910, then the first packet record is again retrieved, via step 918, and the send engine again follows the parameters of the first packet record, via step 902.

Figure 10:
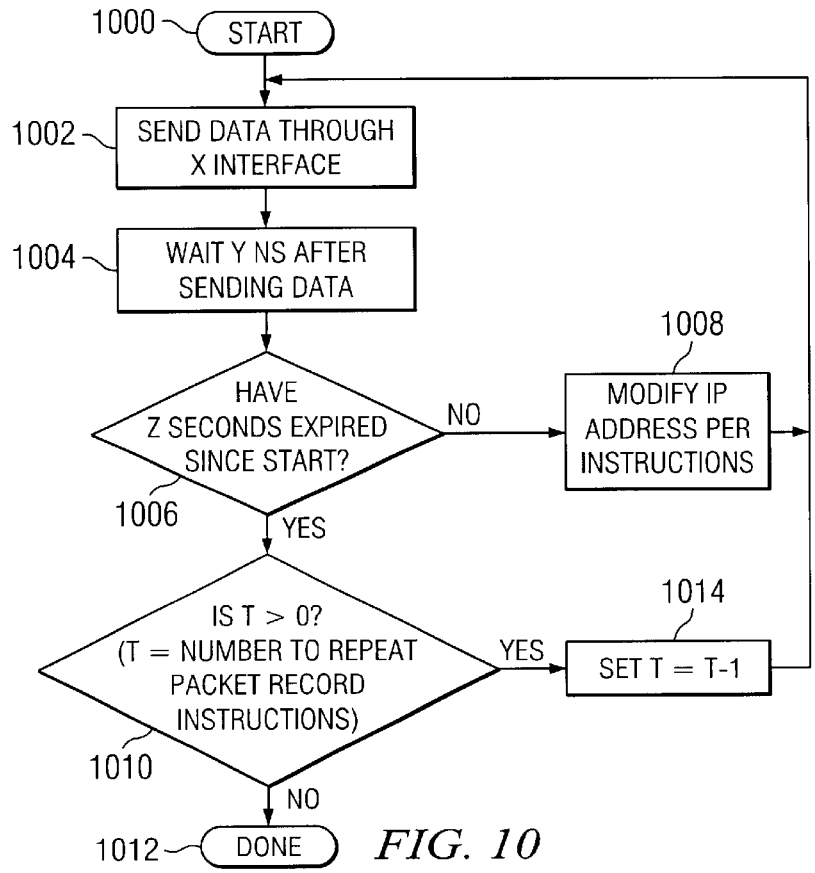
FIG. 10 is a flow diagram of the send engine following parameters of a packet record, according to an embodiment of the present invention.

FIG. 10 is a flow diagram of the send engine following the parameters of the packet record, such as step 902 of FIG. 9. Variables X, Y, Z, and T are initially predetermined as parameters of the current packet record which is being evaluated. The process starts at step 1000, and data is sent through X interface, via step 1002, wherein X indicates a particular interface, such as port 412 of FIG. 4. Thereafter, Y nanoseconds are allowed to pass after sending the data, via step 1004, wherein Y indicates a predetermined number of nanoseconds. It is then determined whether Z seconds have expired since start (step 1000), via step 1006. If Z seconds have not yet expired, then the IP address of the data packet associated with the current record is modified according to the record's instructions, via step 1008, and the data is sent through X interface, via step 1002.

If Z seconds have expired since start (step 1000), via step 1006, then it is determined whether T is greater than 0, via step 1010, where T is equal to a number of times to repeat the packet record instructions. If T is not greater than 0, then the send engine is finished following the parameters of the packet records, via step 1012. If, however, T is greater than 0, via step 1010, then T is set equal to T−1, via step 1014, and the process starts again at step 1000.

Figure 11:
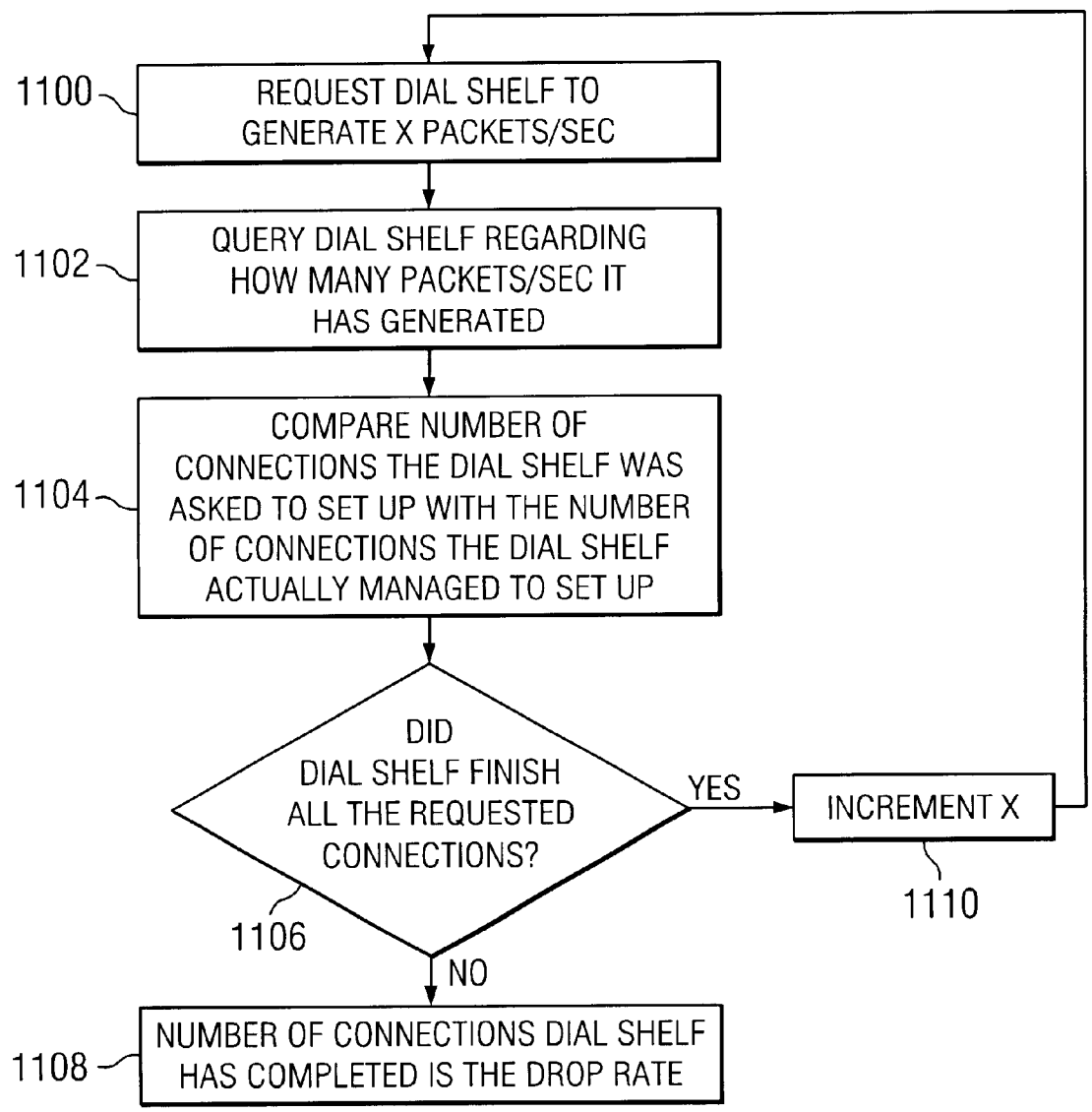
FIG. 11 is a flow diagram of a determination of a drop rate according to an embodiment of the present invention.

FIG. 11 is a flow diagram of a method according to an embodiment of the present invention for determining a drop rate. A drop rate is the maximum rate which the dial shelf 404 of FIG. 4 can transmit data packets. The dial shelf is asked to generate a number of calls and this number is incremented until the dial shelf fails to fulfill the incremented rate. At that point, the drop rate is known. Once the drop rate for a particular bulk call generator is known, the drop rate can again be determined when it is connected to a network. The difference in the drop rate when the bulk call generator is not connected to the network and when the bulk call generator is connected to the network can be attributed to network performance.

In FIG. 11, the dial shelf is requested to generate X packets per second, via step 1100. The dial shelf is then queried regarding how many packets per second it has generated, via step 1102. The number of connections the dial shelf was asked to set up is compared with the number of connections the dial shelf actually managed to set up, via step 1104. It is then determined whether the dial shelf finished all the requested connections, via step 1106. If the dial shelf did not complete all the requested connections, then the number of connections the dial shelf has completed is considered the drop rate, via step 1108. If, however, the dial shelf finished all the requested connections, via step 1106, then X is incremented by a predetermined amount, via step 1110, and the dial shelf is again requested to generate X packets per second, via step 1100.

Embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

A method and system for generating bulk calls and emulating applications has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method of generating a plurality of calls to a network, the method comprising:

providing a data packet with an address, wherein the address identifies a location within a network;

providing a record with a selected one or more of a set of traffic parameters, wherein at least one of the traffic parameters includes a communication interface selection; and communicating the data packet to the network for a simulation purpose, the data packet being sent according to a selected one or more of the traffic parameters.

2. The method of claim 1, further comprising a step of associating the record with the data packet.

3. The method of claim 1, wherein the selected one or more of the traffic parameters includes a rate of sending the data packet.

4. The method claim 1, wherein the selected one or more of the traffic parameters includes a duration during which a rate of sending is applied.

5. The method of claim 1, wherein the record includes a second traffic parameter which includes a number of times to repeat the selected one or more of the traffic parameters.

6. The method of claim 1, wherein the selected one or more of the traffic parameters includes an instruction for modification of the address.

7. A method of generating a plurality of calls to a network, the method comprising:

providing a data packet with an address, wherein the address identifies a location within a network;

providing a record with a selected one or more of a set of traffic parameters, wherein the selected one or more of the traffic parameters includes a communication interface selection;

sending the data packet to the network for a simulation purpose, the data packet being sent according to the selected one or more of the traffic parameters; and determining a drop rate.

8. The method of claim 7, wherein the step of determining the drop rate includes a sub-step of incrementally requesting a predetermined number of connections to the network.

9. A system of generating a plurality of calls to a network, the system comprising:

means for providing a data packet with an address, wherein the address identifies a location within a network;

means for providing a record with a selected one or more of a set of traffic parameters, wherein the selected one or more of the traffic parameters includes a communication interface selection; and means for sending the data packet to the network for a simulation purpose, the data packet being sent according to the selected one or more of the traffic parameters.

10. A computer program product for generating a plurality of calls to a network, the computer program product comprising:

computer code providing a data packet with an address, wherein the address identifies a location within a network;

computer code providing a record with a selected one or more of a set of traffic parameters, wherein the selected one or more of the traffic parameters includes a communication interface selection;

computer code for sending the data packet to the network for a simulation purpose, the data packet being sent according to the selected one or more of the traffic parameters; and a computer readable medium that stores the computer codes.

11. The computer program product of claim 10, wherein the computer readable medium is selected from the group consisting of CD-ROM, floppy disk, tape, flash memory, system memory, hard drive, and data signal embodied in a carrier wave.

12. An apparatus for generating bulk calls, comprising:

a router call generator operable to generate one or more packets that each include an internet protocol (IP) address, the packets being generated in order to simulate network traffic, wherein one or more of the packets may be received and routed to one or more destinations for simulation purposes, and wherein one or more of the packets include a selected one of a set of traffic parameters assigned to one or more selected packets.

13. The apparatus of claim 12, wherein the set of traffic parameters is selected from the group consisting of:

an interface assignment;

a packet issuance rate;

a duration interval for the packet issuance rate;

a number of times for repeating the traffic parameters; and a modification scheme for modifying an IP address included within a selected one or more of the packets.

14. The apparatus of claim 12, wherein one or more of the IP addresses included in the packets are user configurable and are stored in a routing table.

15. The apparatus of claim 12, further comprising:

a router that includes the router call generator.

16. The apparatus of claim 12, wherein the router call generator includes a send engine operable to receive one or more of the traffic parameters and communicate a selected one or more of the packets according to instructions included within the selected one or more of the packets.

17. A method for configuring a router to generate bulk calls, comprising:

implementing a router call generator into the router, the router call generator operable to generate one or more packets that each include an internet protocol (IP) address, the packets being generated in order to simulate network traffic, wherein one or more of the packets may be received and routed to one or more destinations for simulation purposes, and wherein one or more of the packets include a selected one of a set of traffic parameters assigned to one or more selected packets.

* * * * *